(12) United States Patent
Eneroth et al.

(10) Patent No.: US 6,622,563 B2
(45) Date of Patent: Sep. 23, 2003

(54) VIBRATION TESTING APPARATUS ARRANGED TO VIBRATE IN MULTIPLE AXES, METHOD OF VIBRATION TESTING, AND METHOD OF SETTING UP VIBRATION TESTING APPARATUS

(75) Inventors: Sven Eneroth, Lund (SE); Daniel Kristensson, Malmö (SE); Pontus Råsberg, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 10/087,958

(22) Filed: Mar. 5, 2002

(65) Prior Publication Data

US 2002/0144552 A1 Oct. 10, 2002

Related U.S. Application Data

(60) Provisional application No. 60/273,549, filed on Mar. 7, 2001.

(51) Int. Cl.$^7$ ................................................ G01M 7/00
(52) U.S. Cl. ....................................................... 73/662
(58) Field of Search ........................... 73/662, 663, 664, 73/665, 666, 667, 668

(56) References Cited

U.S. PATENT DOCUMENTS

| | | |
|---|---|---|
| 3,691,822 A | 9/1972 | Deckard |
| 4,436,188 A | 3/1984 | Jones |
| 4,602,555 A | 7/1986 | Bushey |
| 4,875,374 A | 10/1989 | Pinson |
| 5,277,066 A | 1/1994 | Marshall |
| 5,343,752 A | 9/1994 | Woyski et al. |
| 5,544,528 A | 8/1996 | Woyski et al. |
| 5,594,177 A | 1/1997 | Hanse |
| 5,650,569 A | 7/1997 | Liu |
| 5,724,893 A | 3/1998 | Lee et al. |
| 6,035,715 A | 3/2000 | Porter |

FOREIGN PATENT DOCUMENTS

GB 2135063 A 8/1984

*Primary Examiner*—Richard A. Moller
(74) *Attorney, Agent, or Firm*—Burns, Doane, Swecker & Mathis, L.L.P.

(57) ABSTRACT

A vibration testing apparatus is arranged to provide vibration in multiple axes and includes a first frame member, at least one actuator connected to the first frame member for vibrating the first frame member in a first direction, and a second frame member for holding devices under test, the second frame member having an axis and being connected to and arranged to vibrate with the first frame member and being arranged to turn about the axis relative to the first frame member. A method of vibration testing and a method of setting up a multiple axis vibration testing apparatus are also disclosed.

40 Claims, 10 Drawing Sheets

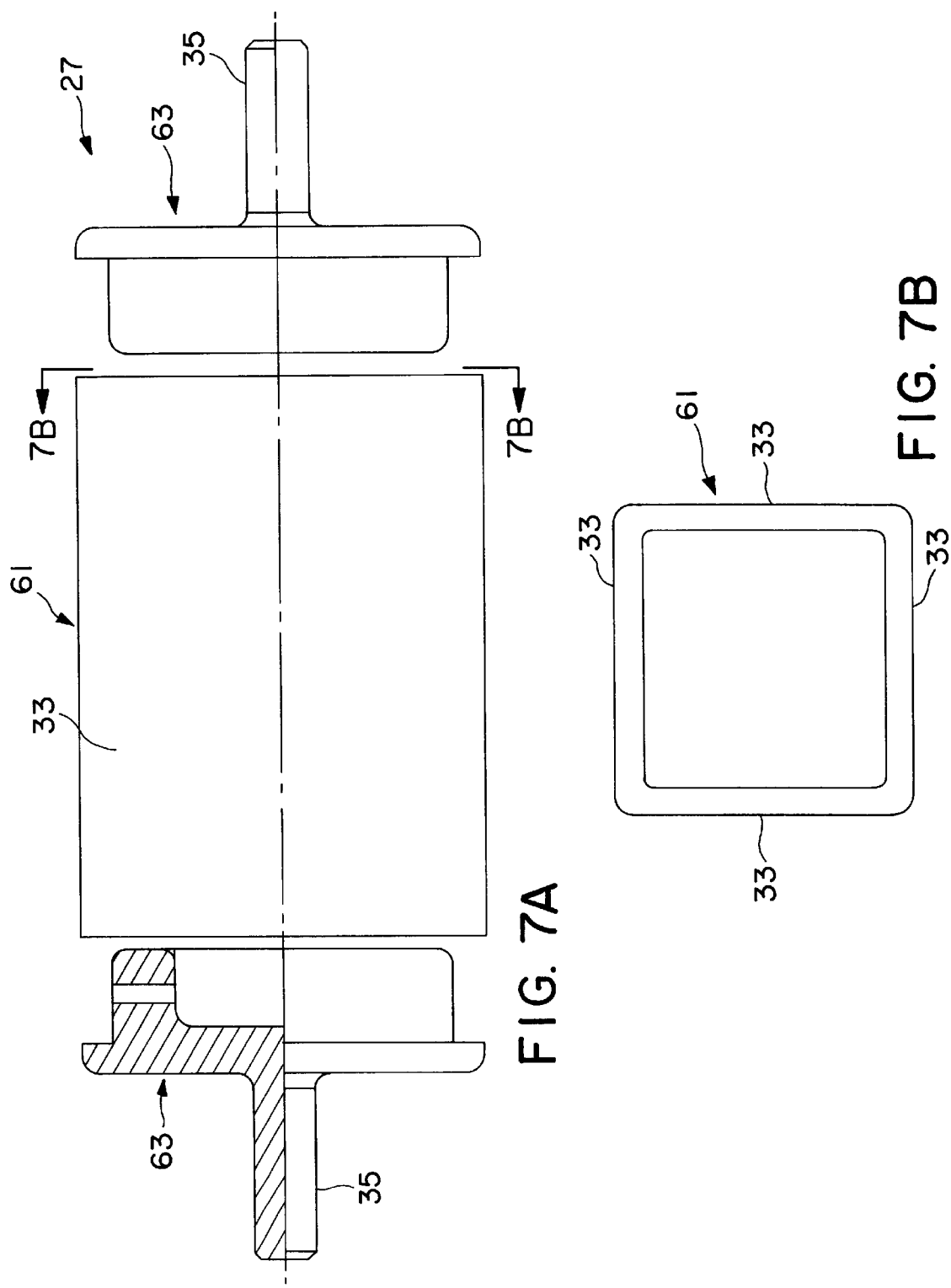

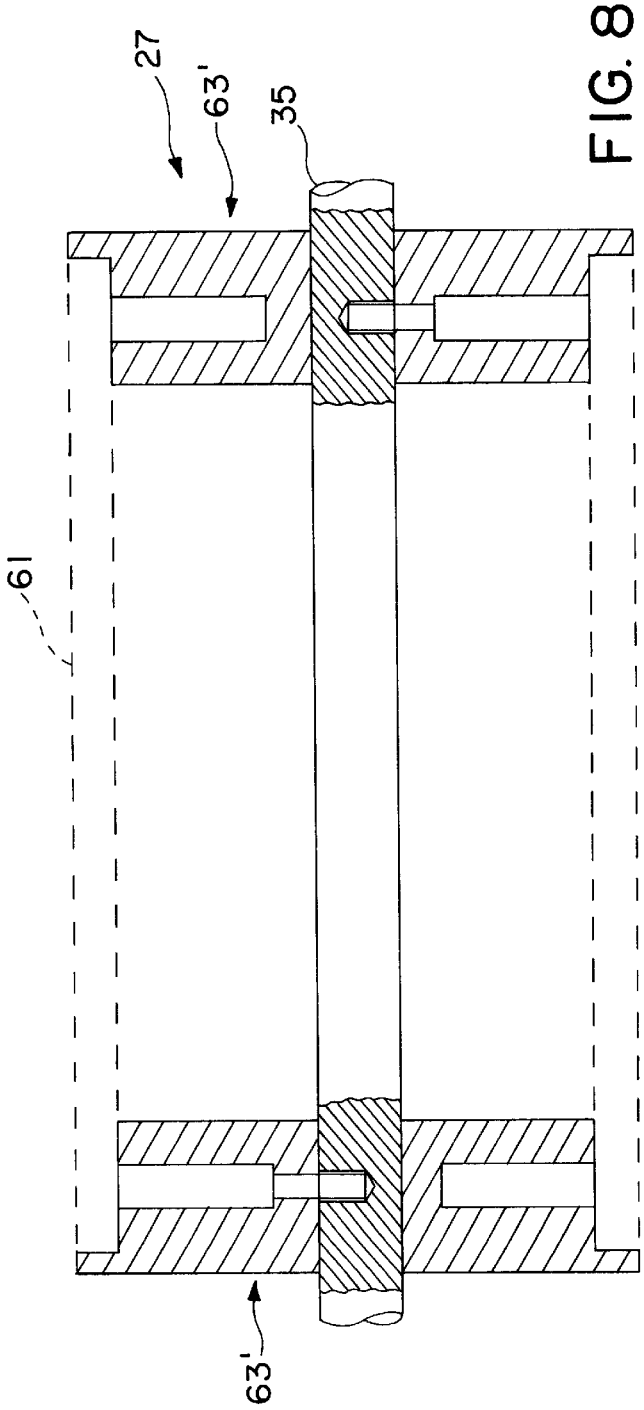
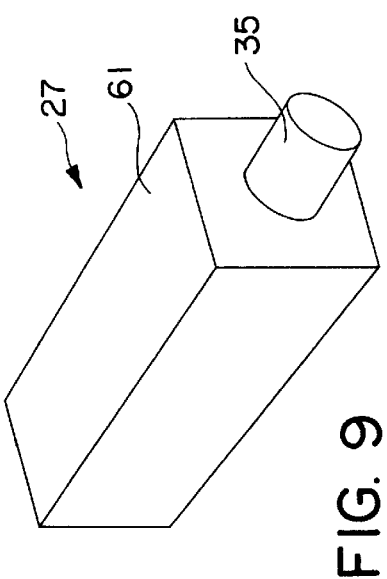
FIG. 8
FIG. 9

VIBRATION TESTING APPARATUS ARRANGED TO VIBRATE IN MULTIPLE AXES, METHOD OF VIBRATION TESTING, AND METHOD OF SETTING UP VIBRATION TESTING APPARATUS

The present application claims the benefit of U.S. Provisional Application No. 60/273,549, filed Mar. 7, 2001, the disclosure of which is incorporated by reference herein.

FIELD OF THE INVENTION

BACKGROUND AND SUMMARY

The present invention relates to a vibration testing apparatus and, more particularly, to a vibration testing apparatus arranged to provide vibration in multiple axes.

It is well known to test articles under simulated use conditions, such as simulations of vibrational forces to which the articles are likely to be exposed. This type of testing is performed for articles such as engine parts, wrist watches, and electronic components, such as cameras and mobile phones. For purposes of illustration, the present invention will be described primarily in connection with its application to vibration testing of mobile phones, but it will be understood that the present invention is equally applicable to testing of other articles.

Vibration testing of articles such as mobile phones will typically attempt to simulate what is expected to happen to the article over long periods of use. Presently available methods vibrate the mobile phones in one direction at a time. Unfortunately, this type of vibration is not characteristic of the vibration to which the phone will actually be exposed during actual use. Comparisons of scratch patterns on laboratory tested phones with those of phones used in the field revealed that the laboratory tested phones have various linear scratches, whereas the phones that were actually used tend to have more blurred scratches reflecting vibration in multiple axes.

Various vibration test apparatus are known, many of which vibrate in multiple axes. For example, U.S. Pat. No. 4,875,374 discloses a test apparatus with a plurality of actuator arms connected to respective drive shafts. U.S. Pat. No. 3,691,822 discloses an apparatus that provides for vibration in three orthogonal directions, with a main object of the vibrator being to maintain a level or horizontal orientation of the object under test. U.S. Pat. No. 4,436,188 discloses a controlled motion apparatus capable of several degrees of freedom that uses three anti-rotating actuators. U.S. Pat. No. 5,650,569 discloses a skewed, multi-axis vibration fixture where a skewed angle between the device under test and the vibration axis is invariable.

In devices to be vibration tested, particularly mobile phones, it is often desirable to provide vibration in all degrees of freedom, translation and rotation. Other characteristics of the test device preferably include:

substantially equal vibration over the entire test surface or rig such that multiple devices on the surface or rig will have been exposed to the same load;
  equal vibration over time to minimize problems of repeatability;
  minimal size so that the test apparatus can fit inside or under a climate controlled test chamber with limited volume;
  ability to generate vibrations in all six degrees of freedom (three translation, three rotation), although not necessarily equal vibrations in all directions;
  ability to operate at any frequency range;
  frequency range between 5–5000 Hz, preferably at least around 10–500 Hz. Vibration is preferably random, and not a sinusoidal oscillation. The Acceleration Spectral Density (ASD) is not limited but is preferably lower at high frequencies;
  ability to mount multiple articles for test on a single fixture;
  accessible system and antenna outlets during test for measurement purposes;
  ability to withstand a predefined environment, such as at least 70° C. and 93% relative humidity;
  ability to perform tests without handling of articles being tested.

In accordance with one aspect of the present invention, a vibration testing apparatus is arranged to provide vibration in multiple axes and includes a first frame member, at least one actuator connected to the first frame member for vibrating the first frame member in a first direction, and a second frame member for holding devices under test, the second frame member having an axis and being connected to and arranged to vibrate with the first frame member and being arranged to turn about the axis relative to the first frame member.

In accordance with another aspect of the present invention, a method of vibration testing includes mounting at least one device to be tested on a test frame, turning the test frame about an axis relative to a main frame, and vibrating the main frame in a first direction.

In accordance with yet another aspect of the present invention, a method of setting up a multiple axis vibration testing apparatus includes selecting an angle through which a test frame of the testing apparatus is adapted to turn about an axis thereof relative to the main frame, the test frame being adapted to have at least one device to be vibration tested mounted thereon, and positioning the test frame at a non-zero angle relative to the main frame selected as a function of the angle.

BRIEF DESCRIPTION OF THE DRAWINGS

The features and advantages of the present invention are well understood by reading the following detailed description in conjunction with the drawings in which like numerals indicate similar elements and in which:

FIG. 7A is a side, cross-sectional view of a test frame according to an embodiment of the present invention, and FIG. 7B is an end view of a drum of the test frame of FIG. 7A;

FIG. 8 is a side, cross-sectional view of a test frame according to another embodiment of the present invention;

FIG. 9 is a perspective view of a test frame according to yet another embodiment of the present invention;

DETAILED DESCRIPTION

Figure 1:
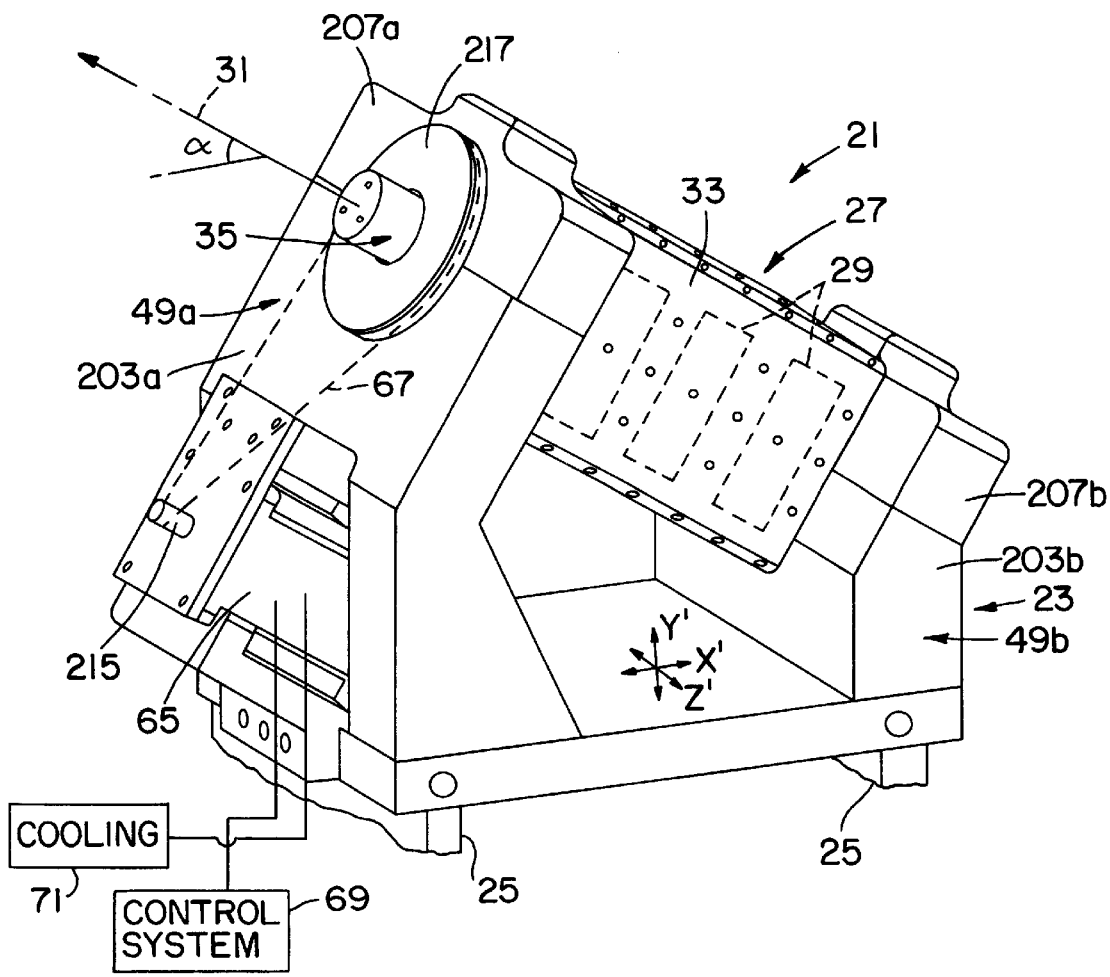
FIG. 1 is a perspective view of a vibration testing apparatus according to an embodiment of the present invention.

FIG. 1 shows an embodiment of a vibration testing apparatus 21 arranged to provide vibration in multiple axes according to the present invention. The apparatus includes a first or main frame 23 and at least one actuator 25 connected to the main frame for vibrating the main frame 23 in a first direction (Y'). A second actuator 25 can also be provided, if desired or necessary, for producing vibrations over time in six degrees of freedom. If two actuators 25 are used, they are preferably connected to the main frame 23 by bearings so the actuators can vibrate at different frequencies. By contrast, a rigid connection is possible where only one actuator 25 is used.

A second or test frame 27 for holding devices under test 29 is provided. The test frame 27 has an axis 31 and is connected to and arranged to vibrate with the main frame 23 and is arranged to turn about the axis relative to the main frame through an angle β (FIGS. 2B–2C). The apparatus 21 shown in FIG. 1 is adapted for vibration testing of mobile phones, however, it will be appreciated that the present invention is applicable to vibration testing for all manner of other components, such as engine parts, wrist watches, other electronic devices such as cameras, and the like.

As can be seen with reference to FIGS. 1 and 2A–2C, the test frame 27 is preferably connected to the main frame 23 at a non-zero angle α relative to a plane (X', Z') perpendicular to the first direction (Y'). The non-zero angle α is preferably independent of the amplitude of vibration A but is a function of the angle β through which the test frame 27 is adapted to turn. Preferably, the non-zero angle α is selected so that when the test frame 27 is vibrated at an amplitude of vibration A and is turned through the angle β, an amplitude of movement x, y, z in an X', a Y', and a Z' axis for all points on the test frame is substantially equal over time.

Figure 2A:
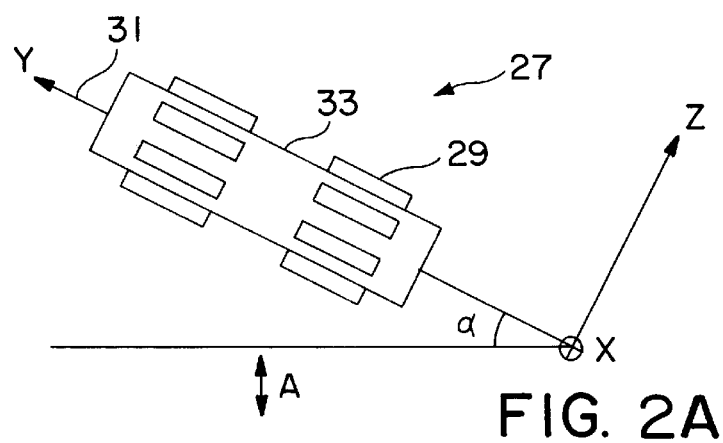
FIGS. 2A–2C are schematic views of a test frame of a vibration testing apparatus according to an embodiment of the present invention.
Figure 2B:
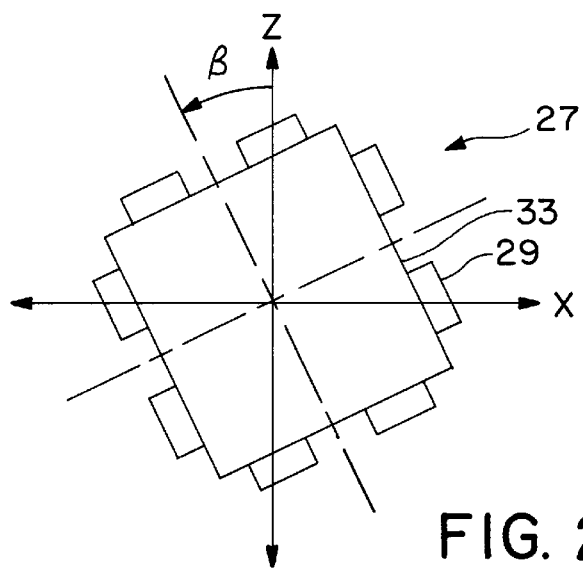
Figure 2C:
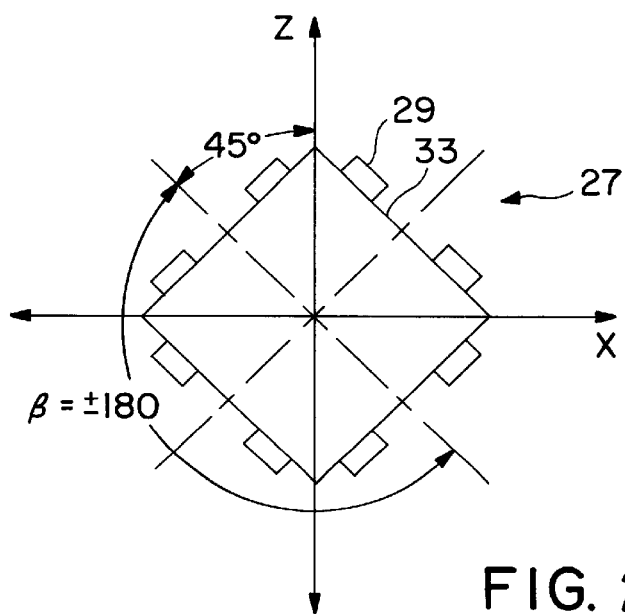

FIGS. 2A and 2B schematically show the test frame 27 relative to an X, Y, Z coordinate system. The movement amplitude in this coordinate system is given by the following expressions:

$$x = A \cdot \cos \alpha \cdot |\sin \beta|$$

$$y = A \cdot \sin \alpha$$

$$z = A \cdot \cos \alpha \cdot |\cos \beta|$$

When the angle β variable is selected, the angle α can be calculated. When β is selected to be 180°, i.e., when the test frame 27 is turned from 0° to 180°, the non-zero angle α can be calculated as follows:

$$x = A \cdot \cos \alpha \cdot \int_0^\pi |\sin \beta| d\beta = A \cdot \cos \alpha \cdot [|-\cos \beta|]_0^\pi = A \cdot \cos \alpha \cdot (1 - -1) = 2 \cdot A \cdot \cos \alpha$$

$$y = A \cdot \sin \alpha \cdot \int_0^\pi d\beta = A \cdot \sin \alpha \cdot \pi$$

$$z = A \cdot \cos \alpha \cdot \int_0^\pi |\cos \beta| d\beta = 2 \cdot A \cdot \cos \alpha \cdot \int_0^{\pi/2} |\cos \beta| d\beta = 2 \cdot A \cdot \cos \alpha \cdot [|\sin \beta|]_0^{\pi/2}$$

$$= 2 \cdot A \cdot \cos \alpha$$

If the amplitude of movement x, y, z along each of the X, Y, Z axes is equal, these expressions should be equal, i.e., x=y=z, so that:

$$x = y \Rightarrow 2 \cdot A \cdot \cos \alpha = A \cdot \sin \alpha \cdot \pi \Rightarrow \tan \alpha = 2/\pi \Leftrightarrow \alpha \approx 32.48°$$

It will be appreciated that the foregoing is merely an example and, for some test situations, x, y, and z are not chosen to be equal, for example, x=2y=z. Moreover, instead of pivoting the test frame, it can be turned in any fashion desired or necessary. For example, the test frame can be continuously rotated. In addition, although embodiments of the test frame are shown here with four sides, it will be appreciated that the test frame may be of any suitable shape and have any suitable number of sides.

Preferably, the magnitude of the angle α is between 30° and 60°. More preferably, the magnitude of the non-zero angle α is between 32° and 33°. When the test frame 27 is arranged to turn through an angle β of about 180°, setting the non-zero angle α between 32° and 33° means that all points on the test frame will be exposed to the substantially the same movement along the X, Y, and Z axes. Using this technique, an equal vibration load over time on devices 29 mounted on the test frame 27 can be achieved.

When the test frame 27 has different surfaces 33 on which plural devices 29 to be tested are to be mounted, it is preferred to orient the surfaces relative to the direction of vibration (e.g., along the Y' axis in FIG. 1) to attempt to further equalize forces on the devices. For example, as seen in FIG. 2B, where there are four surfaces 33 of the test frame 27, and the test frame is arranged to turn through an angle β of 180°, it is preferred that each of those surfaces 33 define a 45° angle with the direction of vibration. If there are more or fewer than four surfaces 33, the surfaces will preferably define smaller or larger angles with the direction of vibration, as appropriate.

The test frame 27 may be arranged to turn through angles β other than 180°. For example, the angle β may be some angle between 90° and 180°, such as an angle of about 90°, instead of the 180° angle β noted above. However, if angle β is only 90°, it is preferred that devices 29 to be tested only be mounted on a single side of the axle 35 of the test frame 27. It is presently understood that such an arrangement will better equalize forces on the devices 29.

The test frame 27 has at least one surface 33 for holding devices 29 under test. Preferably, the test frame 27 has plural surfaces 33 for holding devices 29 under test, such as the four surfaces 33 shown in FIG. 2B. As seen in, for example, FIG. 1, the surface or plural surfaces 33 preferably define a cylinder.

It is desirable that the testing apparatus be stiff enough to avoid disturbances in vibrations. For some disturbances, the vibration level is dependent upon the angle β such as when the level of vibration in the Z axis is higher than the level along the Y axis at turn angle β=0°.

Figure 3:
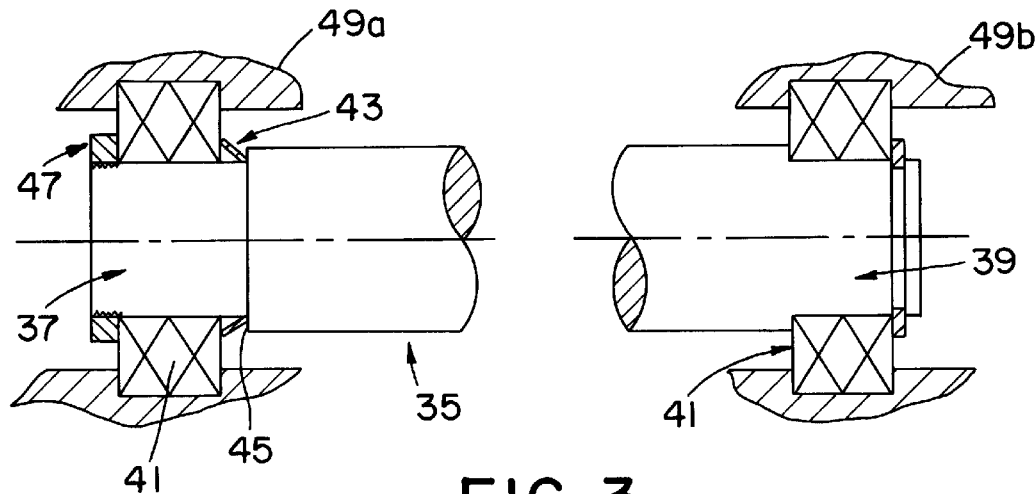
FIG. 3 is a schematic, partially cross-sectional view of a portion of a vibration testing apparatus according to an embodiment of the present invention.

As seen in FIG. 3, the axle 35 of the test frame preferably has first and second ends 37, 39. The first and second ends 37, 39 of the axle 35 are preferably journalled in bearing assemblies 41 attached to bearers 49a and 49b of the main frame 23. The bearing assemblies 41 are preferably selected with an eye to the environment in which the testing apparatus 21 will be used. For example, bearings to be used in a test apparatus for testing of mobile phones should be adapted to hold up where:

there are low rotational speeds of about 0.5 rpm;
rotation or turning is on the nature of one half turn forward and one half turn backward, continuously;
there is low level vibration with an Acceleration Spectral Density (ASD) as low as 0.96 $m^2/s^3$ or lower;
temperatures range from 20° C.–70° C. and there is a relative humidity (RH) of 93%
little maintenance is performed.

In addition, the bearing assemblies 41 will preferably have freedom from play, both axial and radial, and will preferably be low weight. Also, it is desirable to account for other types of problems, such as what components of the bearing assembly 41 will be made of. For example, there might be problems if some components are made of aluminum and others of steel, because aluminum has a thermal expansion coefficient about twice that of steel, if the testing apparatus is going to be operating in an environment where temperatures might range from 20° C.–70° C. FIG. 3, however, shows one possible technique whereby the test frame 27 may be mounted relative to the main frame 23 using bearing assemblies 41 that have different coefficients of expansion than surrounding structures such as the bearing portion of the main frame 23 to which the bearing assemblies are attached. A ring-shaped spring 43 can be provided between the bearing assembly 41 and a surface 45 on the axle so that the spring can be compressed or expand as necessary when the bearing assembly 41 and the surrounding structures expand or contract at different rates. The bearing assembly 41 may be held on the axle 35 between such a spring 43 and a nut 47 threaded onto an end of the axle.

While commercially available bearing assemblies have the advantages of being easily replaced when worn and having the technical expertise of the manufacturer behind them, many commercially available bearing assemblies experience problems under vibrating conditions and at low rotational speeds. Vibrations, for example, cause fatigue on the bearing surfaces which can cause failure. Low rotational speeds make it difficult or impossible for lubricant to build any lifting oil film which can result in metal contact and abrasion. Accordingly, under some circumstances, it may be preferable to use bearing assemblies that are specially designed.

Hybrid bearings with balls made of silicon nitride are presently preferred for use in the bearing assemblies 41 as they can withstand vibration and low rotational speeds well. Bearing assemblies 41 can include assemblies such as single row cylindrical ball bearings and spherical ball bearings, which are presently understood to permit a higher preload than single row cylindrical ball bearings and permit greater angular variation. Hybrid bearings also enjoy an advantage over, for example, steel bearings in that they tend to be more easily lubricated. For example, grease can be used to lubricate hybrid bearings where oil might be necessary with steel bearings.

Figure 4:
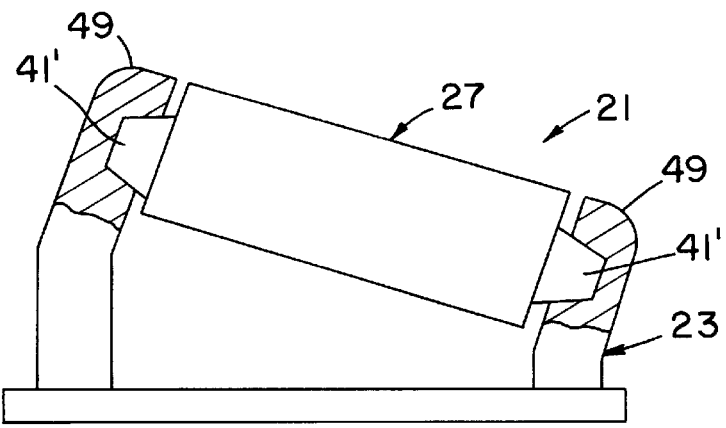
FIG. 4 is a schematic, partially cross-sectional view of a vibration testing apparatus according to an embodiment of the present invention.

Various arrangements are suitable for securing the test frame 27 relative to the main frame 23 so that issues such as expansion of the axle 35 without loss of contact with the bearers 49 can be achieved. FIG. 4 shows an embodiment of the test apparatus 21 wherein the test frame 27 and its axle 35 are fixed between two bearers 49 of the main frame using conical plain bearings 41'. In this embodiment, it is desirable that the position of the bearers 49 be adjustable so that load from the bearers does not interfere with rotation of the bearings 41'. Any suitable arrangement for adjustment of the position of the bearers 49 can be used, such as by supporting one or both of the bearers on a vise-like structure that is movable relative to the rest of the main frame 23, such as by a threaded drive.

Figure 5:
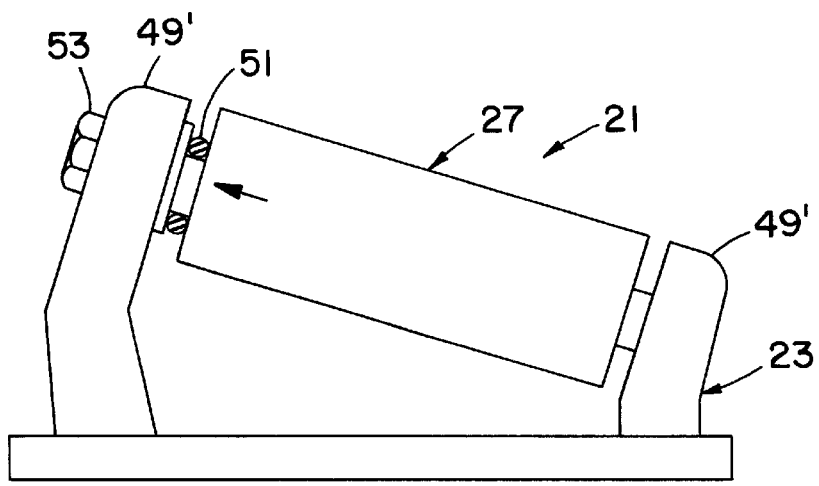
FIG. 5 is a schematic view of a vibration testing apparatus according to another embodiment of the present invention.

FIG. 5 shows another embodiment of the test apparatus 21 wherein the test frame 27 is secured relative to the main frame 23 by axially and radially fixing one end of the axle 35 in a bearing assembly in a bearer 49' and only radially fixing the axle at its other end, and using a rubber ring 51 between the bearer 49' and some surface of the test frame to prevent axial movement of the test frame after the test frame is preloaded between the bearers using a nut 53.

Figure 6A:
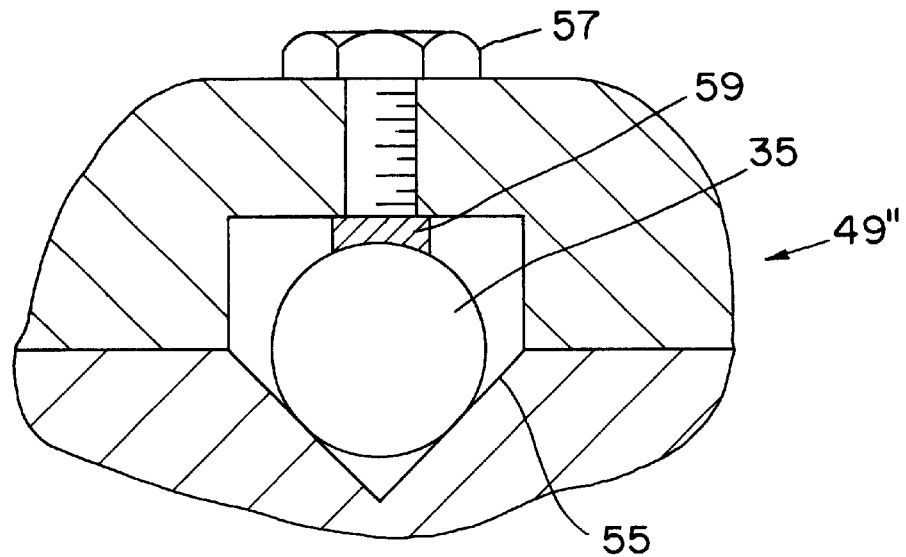
FIGS. 6A–6B are schematic, partially cross-sectional views of portions of a vibration testing apparatus according to an embodiment of the present invention showing a connection between a test frame and a main frame.
Figure 6B:
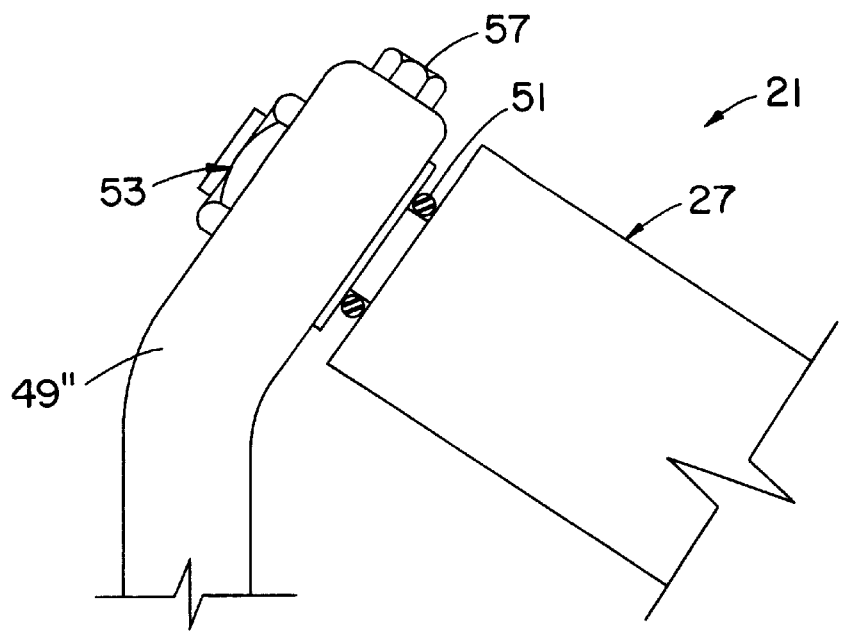

FIGS. 6A and 6B show another embodiment of the test apparatus 21 similar to FIG. 5 wherein the axle 35 of the test frame 27 is caused to rest in a V-shaped block portion 55 of a bearer 49" and is radially supported relative to the main frame 23 by being held against surfaces of the V by some suitable structure, such as a bolt 57 that pushes against a suitable bearing member 59 in contact with the axle. Axial movement of the axle 35 can be restrained in a suitable fashion such as was described with respect to FIG. 5.

The test frame 27 can take various forms. FIGS. 7A–7B show an embodiment of the test frame 27 wherein the surfaces 33 of the test frame on which the devices under test 29 will be secured form a cylindrical drum 61 that may be made out of, for example, a square pipe. The drum 61 is attached, such as by a bolt, at its ends to drum holders 63 that have portions of the axle 35 extending therefrom, thus defining a split axle. The components of the test frame 27 can be made of any suitable material or materials, such as aluminum which permits the test frame to be quite light weight.

FIG. 8 shows another embodiment of the test frame 27 wherein, instead of a split axle, the axle 35 is a solid axle that extends through two drum holders 63'. The components of the test frame 27 may be of any suitable material. The axle 35 may, for example, be made of steel while the drum holders 63' and the drum 61 are made of aluminum to minimize weight. Where different materials are used for the axle 35 and the drum holders 63' and the drum 61, it is preferred that ball or roller bearings adapted to accommodate different coefficients of expansion be used.

FIG. 9 shows another embodiment of the test frame 27 wherein an aluminum axle 35 and drum 61 are formed as one piece, e.g., by machining a block of aluminum. This structure enjoys advantages including no need for joining pieces and great stiffness.

To turn the test frame 27 relative to the main frame 23, a motor 65 (FIG. 1) is preferably provided. A preferred mode of operation of the test apparatus 21 involves accurately rotating or turning the drum 61 back and forth through 180°, i.e., a half turn per minute. The power transmission 67 preferably has great freedom from play and does not introduce any faults. Moreover, it is desirable to mount the motor 65 on the test apparatus 21 so that the transmission 67 can be kept as compact and rigid as possible. A control system 69 such as an automatic control system is preferably also provided for controlling the motor 65 and may be provided, for example, externally of any moving portions of the testing apparatus to minimize the possibility of damage to the control system components. Desirable characteristics of the motor and transmission include:

ability to withstand warm, damp climate;

cause minimal introduction of vibration into the test apparatus 21;

freedom from play;

low maintenance;

simple control;

accurate positioning;

low rotational speed;

minimally affected by vibration;

compact;

light weight.

While many different types of motors may meet some or all of the foregoing characteristics, a presently preferred form of motor is a stepping motor. Stepping motors are considered to be easily controlled and have good reliability. It is preferred that the stepping motor have a small step angle, such as 1000 steps per rotation, as larger steps may cause vibrations to be more significant at low rotary speeds. Moreover, the stepping motor facilitates use of an external automatic control system 69 and use of the stepping motor can be made very flexible in terms of control of the rotary speed and rotary angle. The motor 65 preferably has a protection class IP67 to withstand humidity. It may also be desirable to provide an external cooler for the motor 65.

Figure 10:
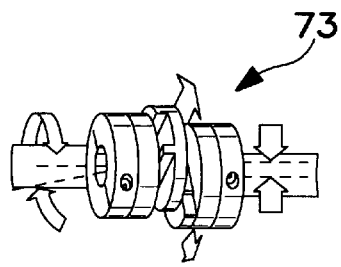
FIG. 10 is a perspective view of a direct transmission suitable for use with the testing apparatus according to the present invention.
Figure 11A:
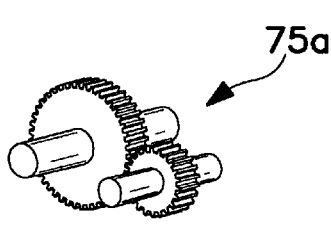
FIGS. 11A–11C are perspective views of toothed transmissions suitable for use with the testing apparatus according to the present invention.
Figure 11B:
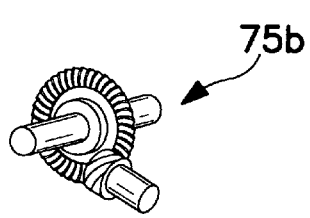
Figure 11C:
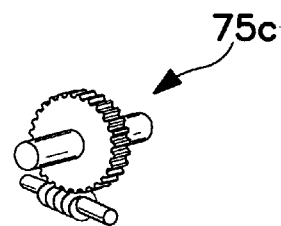

The transmission may be any suitable type of transmission. For example, the transmission may be a direct coupling, a toothed transmission, a belt drive, or a chain drive. FIG. 10 shows a conventional direct Oldham coupling 73 that might be used between the motor and the axle. While simple, this particular type of transmission may not be sufficiently compact for certain applications if it is necessary to mount the motor along the axle on the axis of the test frame. Illustrative types of toothed transmissions 75*a*, 75*b*, 75*c* suitable for use as the transmission are shown in FIGS. 11A–11C.

Figure 12:
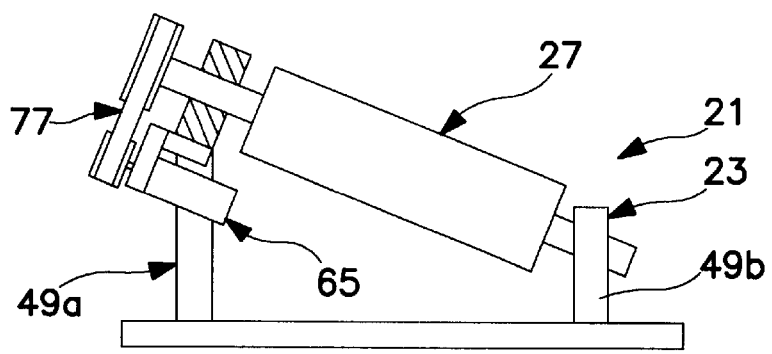
FIG. 12 is a schematic, partially cross-sectional side view of a testing apparatus according to an embodiment of the present invention including a belt transmission.
Figure 13:
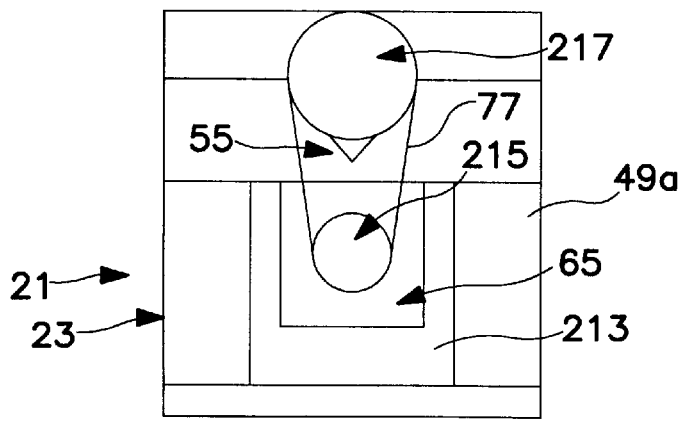
FIG. 13 is a schematic end view of a testing apparatus according to an embodiment of the present invention including a belt transmission.

A suitable belt or chain transmission arrangement is shown in FIGS. 12 and 13. The belt or chain 77 may be any suitable belt or chain. A toothed belt is preferred over a flat belt as play can be minimized, and pre-loading will often be less than in, for example, V-belt transmissions. The motor 65 is preferably mounted on the main frame 23 and the belt or chain 77 preferably assists in holding the test frame 27 relative to the main frame 21, such as by forcing the axle 35 against surfaces of the V-shaped block portion 55 shown in FIG. 6. The dimensions of the test apparatus 21 can be minimized by positioning the motor 65 so that one of the bearers 49*a* is at least partially disposed around the motor, as seen in FIG. 13.

Figure 14:
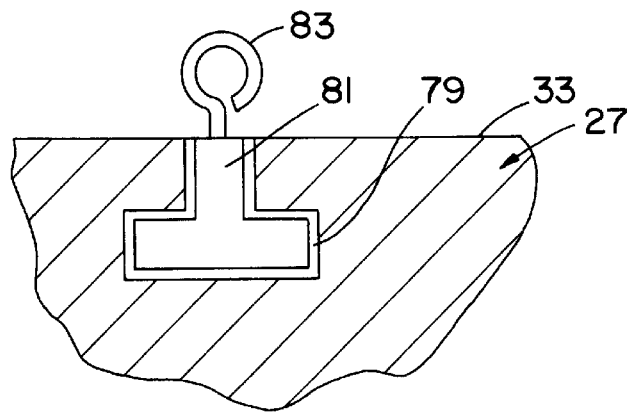
FIG. 14 is a schematic, partially cross-sectional view of a portion of a drum of a test frame for a testing apparatus together with securing structures for a test device according to an embodiment of the present invention.

Various structures may be provided for securing devices under test 29 to the surface or surfaces 33 of the test frame 27. Because it may be desirable to use the testing apparatus 21 for testing of various different devices 29, it is desirable that the structures used to secure the devices offer some flexibility in this regard. FIG. 14 shows one embodiment of a securing structure wherein T-shaped slots 79 are provided in the surface(s) 33 of the test frame 27 and T-slot nuts 81 are slidably positioned in the slots. Eyebolts 83 are threaded into the T-slot nuts and the eyes 85 of the eyebolts extend above the surfaces 33. The devices under test 29 are secured to the surfaces 33 by suitable tie-down structures such as string or plastic or metallic strips or wires.

Figure 15:
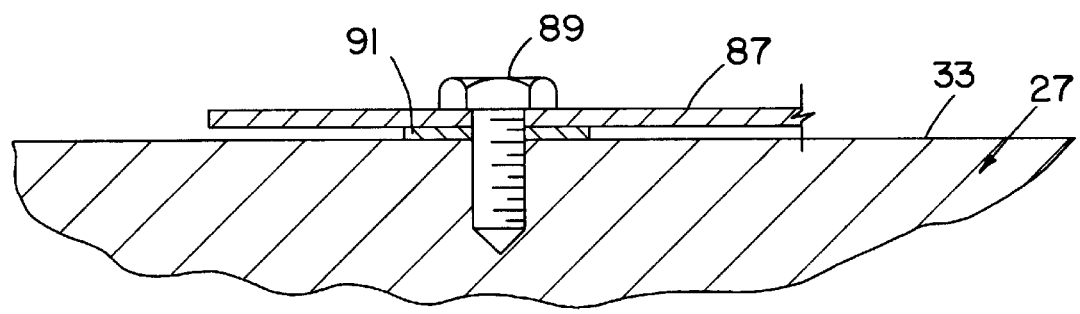
FIG. 15 is a schematic, partially cross-sectional view of a portion of a drum of a test frame for a testing apparatus together with securing structures for a test device according to an embodiment of the present invention.

FIG. 15 shows another embodiment of the testing apparatus with a securing device wherein a flat bar 87 is bolted in position relative to the surface 33 by bolts 89 secured to the test frame 27, such as by mating with internally threaded openings or nuts in the frame. The bar 87 is preferably spaced at a distance from the surface 33 by washers 91. Tie-down structures can be secured to the bar 87 and can be used to secure devices 29 relative to the surface or the bar 87 can be used by itself to hold devices in position.

Figure 16:
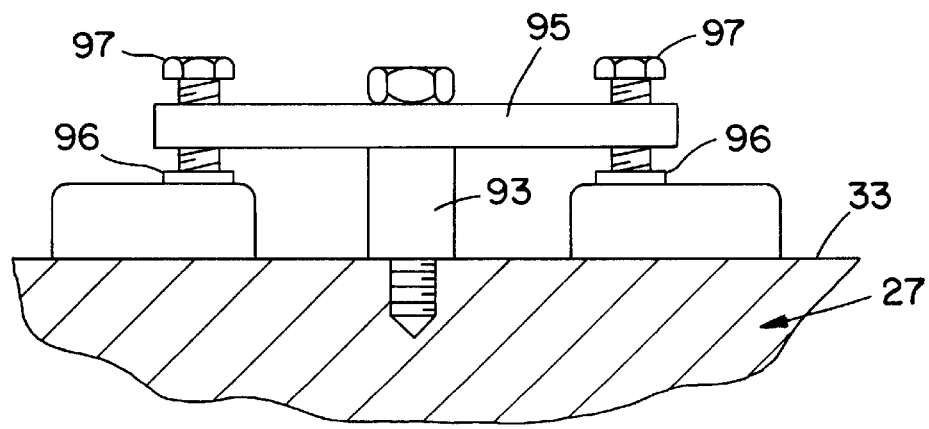
FIG. 16 is a schematic, partially cross-sectional view of a portion of a drum of a test frame for a testing apparatus together with securing structures for a test device according to an embodiment of the present invention.

FIG. 16 shows yet another embodiment of the testing apparatus with a securing device wherein a post 93 is secured to the surface 33 of the test frame 27, such as by the post having a threaded end that mates with internally threaded openings or bolts in the frame, and a cross-bar 95 is bolted to a top of the post. Screws 97 are attached to the cross-bar 95 through threaded openings in the cross-bar or nuts, and can be used to hold down devices under test 29, such as by placing pads 96 between ends of the screws and the devices under test.

Figure 17A:
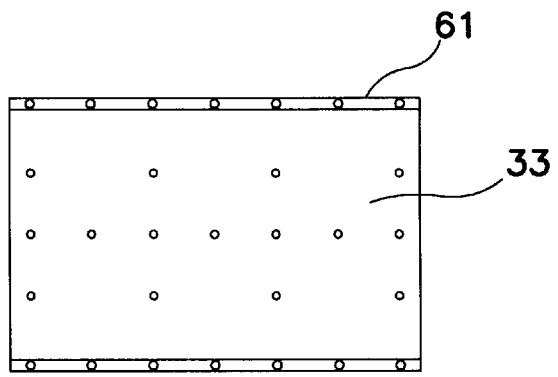
FIG. 17A is a side view of a drum of a test frame according to an embodiment of the present invention.
Figure 17B:
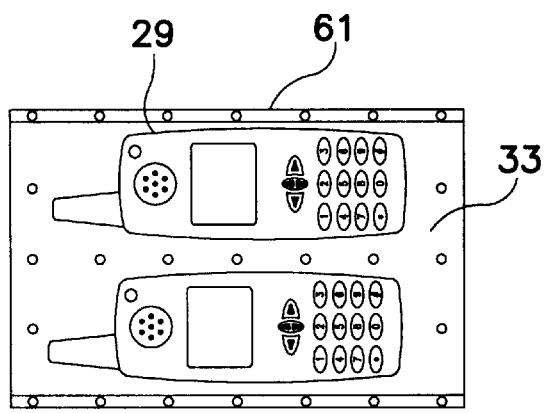
FIGS. 17B and 17C show the side view of the drum with different devices to be tested mounted on the drum.
Figure 17C:
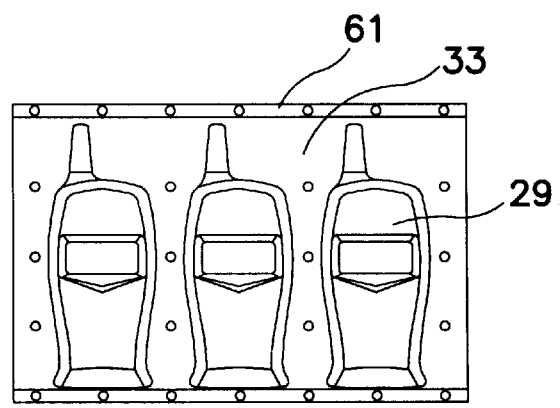

FIG. 17A shows a pattern of holes in a surface 33 of a drum 61 that permits the drum to be used for securing different types of devices to be tested 29. The holes can be used to secure bars such as are shown in FIG. 15 and the devices 29 can be secured by means of suitable tie-down structures or the bars themselves. As seen in FIG. 17C, three short mobile phones 29 might be secured to one surface 33 of the test frame so twelve phones might be tested at once in a test frame having four sides. As seen in FIG. 17B, the same drum 61 can be used to secure two long mobile phones 29 to each side so that eight such phones might be tested at once.

Figure 18:
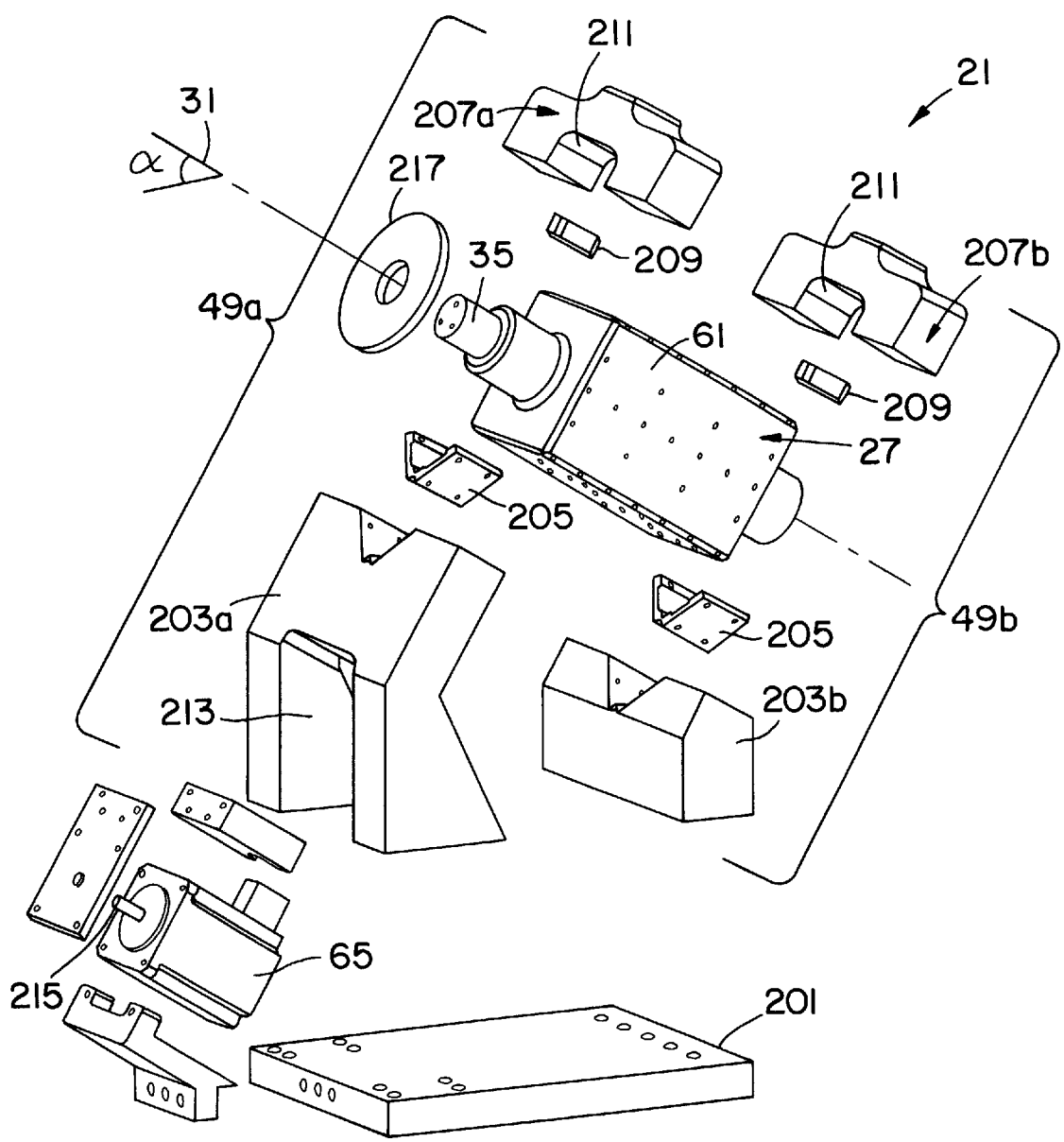
FIG. 18 is an exploded view of the vibration testing apparatus shown in FIG. 1.

The testing apparatus 21 of FIG. 1 is shown in exploded form in FIG. 18. The testing apparatus 21 preferably includes a main frame 23 made up, in this instance, of a base portion 201, a first bearer assembly 49*a* and a second, shorter bearer assembly 49*b* attachable to the base portion, such as by bolts (not shown). The first bearer assembly 49*a* and the second bearer assembly 49*b* each preferably include a bottom portion 203*a* and 203*b*, respectively, with a V-shaped groove therein against the surfaces of which the axle 35 of the test frame 27 is disposed. The bottom portion 203*a* is preferably taller than the bottom portion 203*b* so that the test frame 27 forms a non-zero angle $\alpha$ with a direction of vibration A which is preferably vertical, the angle $\alpha$ preferably being calculated as a function of the angle $\beta$ in the manner described above. A V-shaped bearing or wear block 205 may be provided in the V-shaped groove if desired or necessary.

The first bearer assembly 49*a* and the second bearer assembly 49*b* each also preferably include identical top portions 207*a* and 207*b* attachable to the bottom portions 203*a* and 203*b*, such as by being bolted. Preferably, a rubber or other elastic cushion 209 is adapted to extend from a recess 211 in the top portions 207*a* and 207*b* and be forced down against the axle 35 by a bolt (not shown) in the manner described with reference to FIGS. 6A–6B, thereby minimizing the possibility of radial movement of the test frame 27 relative to the main frame 23.

A motor 65 is preferably mounted in an opening 213 in the bottom portion 203a of the first bearer 49a and a transmission in the form of a toothed belt (not shown) extends between a shaft 215 of the motor and a pulley or sprocket 217 on the axle 35. Mounting of the motor 65 in this fashion minimizes space requirements for the motor and transmission, and assists in holding the test frame 27 in position relative to the main frame 23.

In a method of vibration testing according to an embodiment of the present invention, at least one device to be tested 29 is mounted on a test frame 27 such as is seen in FIG. 1. The test frame 27 is turned about an axis 31 relative to a main frame 23. The main frame 23 is vibrated in a first direction (Y') by one or more actuators 25. The axis 31 of the test frame 27 is preferably set at a non-zero angle α relative to the main frame 23. The magnitude of the non-zero angle α is a function of an angle β through which the test frame is arranged to turn as described above. The test frame 27 is arranged to rotate continuously or to pivot, through any desired angle, however, pivot angles of between 90° and 180° are presently preferred.

While this invention has been illustrated and described in accordance with a preferred embodiment, it is recognized that variations and changes may be made therein without departing from the invention as set forth in the claims.

What is claimed is:

1. A vibration testing apparatus arranged to provide vibration in multiple axes, comprising:
   a first frame member;
   at least one actuator connected to the first frame member for vibrating the first frame member in a first direction;
   a second frame member for holding devices under test, the second frame member having an axis and being connected to and arranged to vibrate with the first frame member and being arranged to turn about the axis relative to the first frame member.

2. The vibration testing apparatus as set forth in claim 1, wherein the second frame member is connected to the first frame member at a non-zero angle relative to the first direction.

3. The vibration testing apparatus as set forth in claim 2, wherein a magnitude of the non-zero angle is a function of an angle through which the second frame member is arranged to turn.

4. The vibration testing apparatus as set forth in claim 3, wherein the magnitude of the non-zero angle is between 30° and 60°.

5. The vibration testing apparatus as set forth in claim 4, wherein the magnitude of the non-zero angle is between 32° and 33°.

6. The vibration testing apparatus as set forth in claim 2, wherein the magnitude of the non-zero angle is between 30° and 60°.

7. The vibration testing apparatus as set forth in claim 6, wherein the magnitude of the non-zero angle is between 32° and 33°.

8. The vibration testing apparatus as set forth in claim 1, wherein the second frame member is arranged to pivot about the axis relative to the first frame member.

9. The vibration testing apparatus as set forth in claim 1, wherein the second frame member is arranged to turn continuously about the axis relative to the first frame member.

10. The vibration testing apparatus as set forth in claim 1, wherein the second frame member is arranged to pivot through an angle of about 180°.

11. The vibration testing apparatus as set forth in claim 1, wherein the second frame members is arranged to pivot through an angle of about 90°.

12. The vibration testing apparatus as set forth in claim 1, wherein the second frame member is arranged to pivot through an angle between 90° and 180°.

13. The vibration testing apparatus as set forth in claim 1, wherein the second frame member has at least one surface for holding devices under test.

14. The vibration testing apparatus as set forth in claim 13, wherein the second frame member has plural surfaces for holding devices under test.

15. The vibration testing apparatus as set forth in claim 14, wherein the second frame member has four surfaces for holding devices under test.

16. The vibration testing apparatus as set forth in claim 15, wherein the plural surfaces define a cylinder.

17. The vibration testing apparatus as set forth in claim 14, wherein the plural surfaces define a cylinder.

18. The vibration testing apparatus as set forth in claim 13, wherein the at least one surface defines a cylinder.

19. The vibration testing apparatus as set forth in claim 1, wherein the second frame member includes an axle having first and second ends, the first and second ends of the axle being journalled in bearing assemblies attached to the first frame member.

20. The vibration testing apparatus as set forth in claim 1, further comprising a motor for turning the second frame member.

21. The vibration testing apparatus as set forth in claim 20, wherein the motor is mounted on the first frame member.

22. The vibration testing apparatus as set forth in claim 21, further comprising a transmission arrangement between the motor and the second frame member for turning the second frame member.

23. The vibration testing apparatus as set forth in claim 22, wherein the transmission is a direct coupling.

24. The vibration testing apparatus as set forth in claim 22, wherein the transmission is a toothed transmission.

25. The vibration testing apparatus as set forth in claim 22, wherein the transmission is a belt drive.

26. The vibration testing apparatus as set forth in claim 22, wherein the transmission is a chain drive.

27. The vibration testing apparatus as set forth in claim 1, wherein two actuators are connected to the first frame.

28. The vibration testing apparatus as set forth in claim 1, wherein the first frame member, the actuator, and the second frame member are arranged such that amplitudes of vibration of points on the second frame member along three axes of a coordinate system are different along at least two of the axes.

29. The vibration testing apparatus as set forth in claim 1, wherein the first frame member, the actuator, and the second frame member are arranged such that amplitudes of vibration of points on the second frame member along three axes of a coordinate system are substantially the same along all of the axes.

30. A method of vibration testing, comprising:
   mounting at least one device to be tested on a test frame;
   turning the test frame about an axis relative to a main frame; and
   vibrating the main frame in a first direction.

31. The method of vibration testing as set forth in claim 30, comprising setting the axis of the test frame at a non-zero angle relative to the main frame.

32. The method of vibration testing as set forth in claim 31, wherein a magnitude of the non-zero angle is a function of an angle through which the test frame is arranged to turn.

33. The method of vibration testing as set forth in claim 32, wherein the magnitude of the non-zero angle is between 30° and 60°.

34. The method of vibration testing as set forth in claim 30, wherein the test frame is arranged to pivot through an angle between 90° and 180°.

35. The method of vibration testing as set forth in claim 30, wherein amplitudes of vibration of points on the test frame along three axes of a coordinate system are different along at least two of the axes.

36. The method of vibration testing as set forth in claim 30, wherein amplitudes of vibration of points on the test frame along three axes of a coordinate system are substantially the same along all of the axes.

37. The method of vibration testing as set forth in claim 30, wherein the test frame is pivoted about the axis.

38. The method of vibration testing as set forth in claim 30, wherein the test frame is continuously rotated about the axis.

39. A method of setting up a multiple axis vibration testing apparatus, comprising:

selecting an angle through which a test frame of the testing apparatus is adapted to turn about an axis thereof relative to the main frame, the test frame being adapted to have at least one device to be vibration tested mounted thereon; and positioning the test frame at a non-zero angle relative to the main frame selected as a function of the angle.

40. The method as set forth in claim 39, wherein the non-zero angle is selected so that when the main frame is vibrated at an amplitude of vibration and the test frame is turned through the angle, an amplitude of movement in each of an X, a Y, and a Z axis for all points on the test frame is substantially equal over time.

* * * * *